Jan. 8, 1952     S. HOCHBERG     2,581,414
PROCESS FOR DISPERSING PIGMENTS IN FILM-FORMING MATERIALS
Filed Aug. 13, 1948
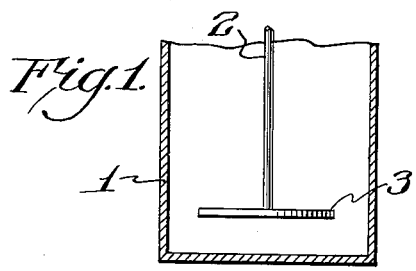
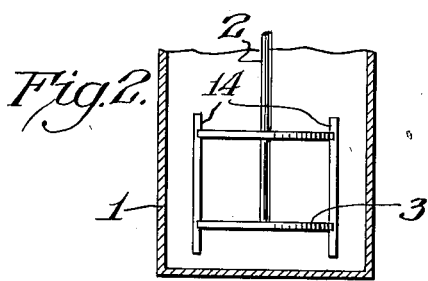
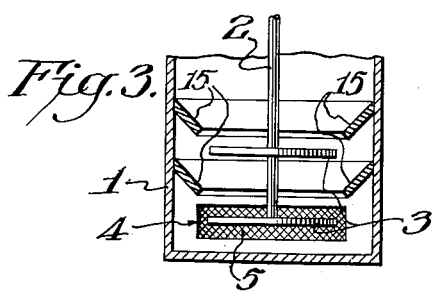
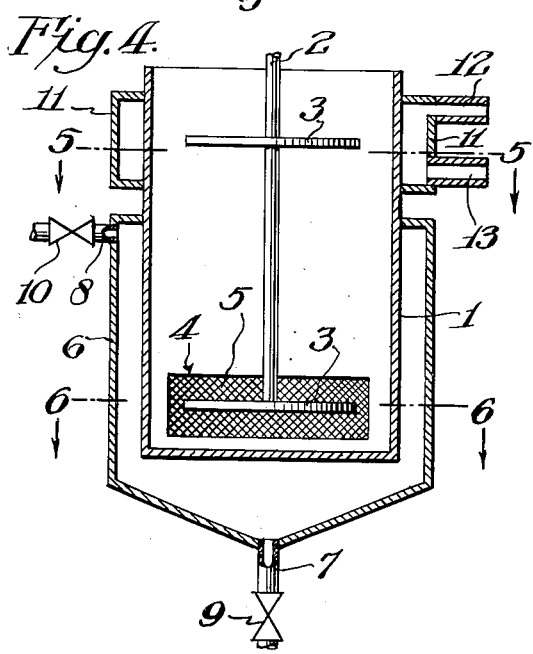
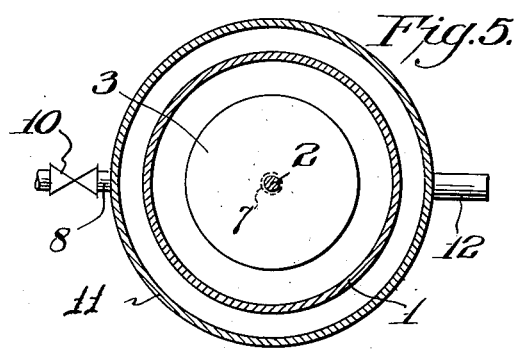
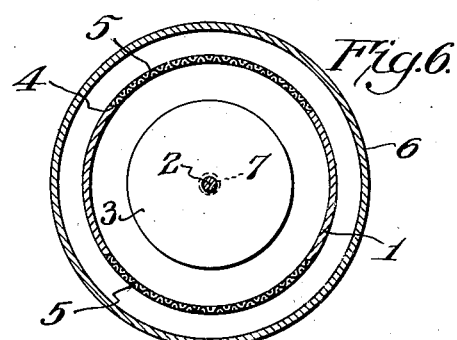
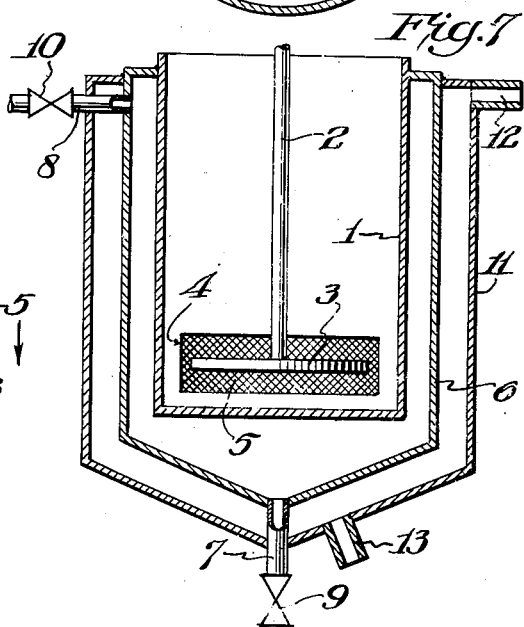
INVENTOR.
Seymore Hochberg
BY
a. Newton Huff
ATTORNEY Patented Jan. 8, 1952

2,581,414

UNITED STATES PATENT OFFICE 2,581,414

PROCESS FOR DISPERSING PIGMENTS IN FILM-FORMING MATERIALS

Seymore Hochberg, Upper Darby, Pa., assignor to E. I. du Pont de Nemours & Company, Wilmington, Del., a corporation of Delaware Application August 13, 1948, Serial No. 44,152

4 Claims. (Cl. 241—22)

This invention relates to a new and improved process of dispersing pigments in liquid media and/or reducing the particle size of pigments.

It has long been a problem in the art of dispersing solids in liquids to economically and efficiently incorporate the solids in such a way that they will remain in suspension for long periods of time, and, in the case of pigments in film-forming vehicles, that their particle size will permit smooth non-granular films, having suitable color and hiding power characteristics.

Prior processes for incorporating solids in liquids have involved the use of various grinding and dispersing machines, such as buhrstone mills, ball or pebble mills, roller or rubber mills, colloid mills, Werner and Pfleiderer mixers, and Banbury mixers. In these machines, the solids were subjected to rubbing, impact, shearing, or attrition, or a combination of these actions, usually in the presence of a liquid dispersion medium. However, each of these machines, or its corresponding process, has one or more disadvantages; e. g., large investment required, expensive maintenance, low production volume, poor efficiency, introduction of undesirable impurities, or long processing periods. Some commercial processes have involved the use of a plurality of these machines, but there has always been a need for a process which embodies the best aspects of the aforementioned machines without having to utilize expensive or complicated equipment.

It is a principal object of this invention to provide a simple, inexpensive, and efficient process for dispersing pigments in liquid or fluid media. It is another object to provide inexpensive, efficient grinding apparatus for dispersing pigments in liquids or fluids which is low in original cost, easy to operate, and inexpensive to maintain. It is a further object to provide an improved dispersion process resulting in thoroughness of dispersion, low power consumption and cost per unit of pigment dispersed, increased "mill capacity" or pounds of pigment dispersed per unit of time, an improvement in the overall cost-quality balance in the final composition. It is a still further object to provide an improved dispersion process resulting in thorough dispersion in a shorter time than heretofore possible. It is a more specific object to provide an improved process for the speedy dispersion of pigments in coating compositions. It is still another object to provide an improved process of breaking agglomerates and reducing the particle size of pigments.

These objects, and others which will be apparent as the description proceeds, are accomplished by agitating, in a suitable apparatus, 20–40 mesh sand, a film-forming dispersing material, and the pigment to be dispersed.

While it has been found that sand of any type will function in this process, it is preferred to use Ottawa type sand.

The term "Ottawa sand" is applied to sand found in the vicinity of Ottawa, Illinois, and is referred to in A. S. T. M. Specification C–190 as a standard testing sand for testing concrete. It is sold under that designation as a regular article of commerce. It is characterized by having a high (99% or more) silica content, substantially all of the particles are individual crystals or parts thereof, practically no conglomerates or groups of crystals cemented by foreign materials are present, and the individual particles have rounded edges.

Sand is commonly sold by size designation, such as "20–30 mesh." This means that the sand particles are small enough to pass through a No. 20 sieve but large enough not to pass through a No. 30 sieve. A. S. T. M. Specification E–11 for Sieves gives the following relations between sieve numbers and sieve openings:

| Sieve No. | Sieve Opening |
|---|---|
|  | mm. |
| 4 | 4.76 |
| 10 | 2.00 |
| 12 | 1.68 |
| 16 | 1.19 |
| 20 | 0.84 |
| 30 | 0.59 |
| 40 | 0.42 |
| 50 | 0.297 |
| 60 | 0.250 |
| 70 | 0.210 |
| 80 | 0.177 |
| 100 | 0.149 |
| 120 | 0.125 |
| 140 | 0.105 |
| 170 | 0.088 |

In order to more clearly describe this invention, reference is made to the accompanying drawing which illustrates embodiments of apparatus suitable for carrying out the invention, in which:

Fig. 1 is a vertical sectional view of a simple and efficient apparatus for intermittent or batch operation;

Figs. 2 and 3 are vertical sectional views showing modifications of the apparatus illustrated in Fig. 1;

Fig. 4 is a vertical sectional view of an apparatus for continuous operation;

Figs. 5 and 6 are horizontal sections on the lines 5—5 and 6—6, respectively, of Fig. 4; and Fig. 7 is a vertical sectional view showing a modification of the apparatus illustrated in Fig. 4.

Referring to Fig. 1, the apparatus comprises an open top cylindrical vessel 1, having a motor driven agitator shaft 2 suspended vertically along its axis. Shaft 2 is provided with one or more impellers 3 of any desired shape, such as flat or curved circular discs, pitched propellers, paddles, or other stirring means.

The continuous operation apparatus shown in Fig. 4 comprises a vessel 1 having impellers 3 mounted on a shaft 2. The vessel 1 has a suitable opening 4, of any desired shape and in any desired position along its side, top, or bottom (but here shown on one side near the bottom), covered by a mesh screen 5. A circumferential jacket 6 surrounds the lower portion of vessel 1, and is equipped with openings 7 and 8, for discharging the processed material, that are controlled by valves 9 and 10, respectively. The main purposes of this jacket are to keep the outer surface of the screen wet, to take the inside pressure of the liquid head in vessel 1 off the screen by the liquid in the jacket resisting that pressure, and to establish a reservoir so that a uniform discharge rate can be maintained. The upper portion of the vessel 1 is provided with a circumferential jacket 11 equipped with inlet and outlet openings 12 and 13, respectively, for a temperature controlling fluid, such as water or steam (not shown).

The screen 5 is mounted over the opening 4 in vessel 1 by any means which avoids leakage around the edges. The mesh size of the screen must be such that the dispersion will flow freely therethrough during normal operation, without allowing the sand to pass through. For example, in enamel mill base production using 20–30 mesh sand (0.84–0.59 mm.), a standard 80 x 80 mesh screen having 0.177 mm. openings is suitable.

It should be understood that the drawing illustrates simple examples of the many embodiments useful in the broad aspects of this invention, and therefore illustrates only the basic elements involved. For instance, (1) the top of vessel 1 may be open or closed; (2) as shown in Fig. 2, the impellers may be equipped with vertical bars 14 on the outer extremity; (3) as shown in Fig. 3, the grinding vessel may contain baffles 15 of any desired design; and (4) as shown in Fig. 7, the jacket 11 may surround the entire unit, including jacket 6. Furthermore, the impellers 3 may be mounted on- or off-center and at any desired angle to the shaft 2, but are here shown on-center.

The actual dimensions are not critical, but the drawings are approximately to scale for an apparatus that could be used in making an enamel mill base.

The materials of construction are preferably steel, although the equipment may be surfaced with rubber or the like, and the impellers may be of glass or other suitable material.

In batch operation, the ingredients are added in the proper proportions and stirred at a fast enough rate to keep the concentration of the components reasonably uniform throughout the vessel. The mixing is stopped at the desired point in the process, and the sand is separated from the mixture by settling, decanting, centrifuging, straining, or other convenient means.

In using the equipment shown in Fig. 4, to make an enamel mill base by a continuous process, the pigment and vehicle can be premixed into a slurry in the proper proportions, or the individual ingredients may be metered or weighed into the apparatus through the top by hand or automatic means. The proper ratio of sand to slurry by volume having previously been determined (30%–65% sand to 70%–35% slurry), and the proper amount of sand and other components having been charged into the grinding vessel, this ratio is maintained by controlling the input rate of dispersing medium and material to be dispersed so that it equals the output rate of completely dispersed material.

While the ingredients are being charged into vessel 1, with the lower valve 9 closed and the upper valve 10 open, the impellers 3 are revolving at the desired speed. The sand particles, which are moving relatively fast and are distributed uniformly throughout the mixture, disperse the pigment in the vehicle, break up agglomerates, and produce a smooth uniform dispersion which flows through screen 5, while the latter retains the sand. Upon filling the jacket 6, the dispersed material flows from opening 8 at a rate controlled by valve 10. If the process requires heating or cooling, a suitable heat exchanging fluid may be circulated through jacket 11 via connections 12 and 13. Upon completion of the operation, the apparatus can be drained and flushed through opening 7 and valve 9, or it can be left in "standby" condition by closing valves 9 and 10, filling the vessel to the desired level with a suitable solvent, and covering the top of the vessel.

Because the presence of grit, or rough, hard particles in an otherwise smooth film has always been associated with dirty grinding agents for paints, enamels, and similar coating compositions, great pains have been taken, especially in making high quality enamels, lacquers, and fabric coatings, to avoid the presence of any such contaminating ingredients in the final coating. It was quite unexpected, therefore, that the deliberate use of sand as the grinding and dispersing agent in the manufacture of such compositions would yield satisfactory products, and it was even more unexpected that it would yield, in many cases, an improved material from the stand-points of uniform dispersion, fineness of particles, gloss, color, and smoothness of the final film, and complete absence of grit. There was likewise no reason to expect the resulting ease of operation and absolute efficiency of the process, or even its relative efficiency when compared to other enamel grinding processes.

The following examples are illustrative of the invention:

EXAMPLE 1

*Alkyd resin enamel mill base*

| | Grams |
|---|---|
| 52.7% linseed oil modified glycerol phthalate resin | 15.1 |
| Soya lecithin (50% solution) | 1.5 |
| Hydrocarbon solvent | 17.5 |
| Phenolic inhibitor (1% solution) | 2.8 |
| Titanium dioxide pigment | 63.1 |
| | 100.0 |

For a direct comparison of several types of sand, a slurry of about one gallon of the above composition (a mill base for a high quality enamel) was prepared for each type of sand to be tested. For each test this slurry was ground, with 1000 grams of the sand to be tested, in a one-quart continuous grinding vessel equipped with a 100 x 100 mesh wire screen and provided with two 2½ inch diam. glass disc impellers spaced about 1½ inches apart on the shaft, which was driven at 2350 R. P. M. Sufficient slurry was added to bring the level, during agitation, up to about ½ inch from the top of the vessel, resulting in a volume ratio of sand to total mixture (sand and slurry) of approximately 50%. While continuously agitating, additional slurry was added (until practically all of the batch had been processed) at a rate equal to the rate of outflow of dispersed mill base in order to maintain a substantially constant volume ratio of sand to total mixture.

The results of these tests provided the following information on the utility of the various types of sand in this process:

1. Since 4 mesh (4.76 mm.) particle size sand was not available, and glass possesses the properties of sand to a large extent, glass balls of 5 mm. diameter were tested in place of sand. This yielded an average production rate of 6 gallons per hour, but the dispersion produced was unsatisfactory for enamels, or even for good quality house paints, since it gave fineness readings greater than 0.002 inch on a scrape-type fineness of grind tester based on North Fineness Standards (with a range of 0.0020–0.0000 inch depth) resulting from pigment agglomerates that were not broken down.

2. 12 mesh New Jersey sand yielded an average production rate of 2.5 gallons per hour. The fineness was slightly coarser than 0.0005 and satisfactory for good quality house paints, but not for enamels.

3. 20–30 mesh Ottawa sand yielded an average production rate of 0.833 gallon per hour at a fineness of 0.0004, which was satisfactory for enamels.

4. 30–40 mesh Cape May sand yielded an average production rate of 0.79 gallon per hour at a fineness of 0.0002.

5. 70–90 mesh Ottawa sand yielded an average production rate of 0.313 gallon/hour at a suitable fineness. This was faster than conventional grinding equipment but sufficiently slower than the previous tests to make it less useful in a commercial process.

6. 115–150 mesh Ottawa sand, prepared by grading sand which had purposely been powdered in a grinding mill, required 200 x 200 mesh screen to retain the sand, but experience showed that a substantial amount of still finer sand was present in the resulting dispersion, indicating that it had been impossible to remove these extremely fine particles of sand in the grading process. This yielded a very slow production rate of 0.0695 gallon per hour, and the resulting mill base was unusable because it was gritty due to the presence of small sand particles.

EXAMPLE 2

*Alkyd resin enamel mill base*

| | Parts by weight |
|---|---|
| 52.7% linseed oil modified glycerol phthalate resin | 45.0 |
| Petroleum hydrocarbon solvent | 45.8 |
| Beaded carbon black pigment | 9.2 |
| | 100.0 |

The alkyd resin solution and the pigment were fed separately into a 5 gallon continuous grinding apparatus, similar to that shown in Fig. 4, but having no jacket enclosing the screen area, in the ratio of 90.8 parts of solution to 9.2 parts of pigment. The apparatus contained about 50 pounds of 20–30 mesh Ottawa sand. The process was controlled so as to keep the liquid level at about 4.5 gallons. Agitation was provided at about 600 R. P. M. for about 20 minutes with a cover plate over the screen to prevent efflux. The plate was then removed, agitation was continued, and ingredients were added in the above ratio at a rate equal to the output which was about 8 gallons per hour.

This black mill base was suitable for further processing into a black enamel by addition of conventional enamel producing film-forming materials, suitable driers, and solvents. It could also be used to impart a black tint to other enamels.

EXAMPLE 3

*Enamel*

| | Grams |
|---|---|
| Butanol modified urea formaldehyde resin solution in butanol (60% solids) | 15 |
| 55% castor oil modified glycerol phthalate resin solution in 20–80 mixture of petroleum hydrocarbon and butanol (65% solids) | 17 |
| Hydrocarbon solvents | 130 |
| Titanium dioxide pigment | 392 |
| | 554 |

This composition was ground in a quart can with 1000 grams of 20–30 mesh Ottawa sand for 15 minutes and yielded a mill base which was reduced with additional resins and solvents to produce a hard baking-type industrial enamel.

In addition to the alkyd resin enamel products of Examples 1, 2, and 3, other alkyd resin enamel mill bases or finished enamels can be produced using other alkyd resins made with various polyhydric alcohols, polycarboxylic acids, and oils or oil acids, and widely varying ratios of components. The nature of the oil or oil acid modifier in the resin is not critical. Drying oils, such as linseed, tung, and dehydrated castor work satisfactorily, as do semi-drying oils, such as soya, and non-drying oils, such as castor, as well as their oil acids.

EXAMPLE 4

*Fabric coating composition*

| | Parts by weight |
|---|---|
| Chlorosulphonated polyethylene (25% dispersion in toluene) | 200 |
| Toluene | 95 |
| Ethyl alcohol (2B denatured) | 5 |
| Barytes pigment | 100 |
| | 400 |

The chlorosulphonated polyethylene was prepared in accordance with the disclosure in United States Patent No. 2,212,786.

The above ingredients were mixed, a volume of 20–30 mesh Ottawa sand corresponding to about 50% of the volume of the above mixture was added, and the mass was stirred in an ordinary quart can by a conventional propeller blade agitator for 15 minutes at 2000 R. P. M. The mass was then allowed to stand for about 5 minutes, during which time all the sand had settled, holding part of the dispersed material. The supernatant dispersion was easily decanted from the residue with a yield of about 80%. A yield of 100% was obtained on subsequent charges, using additional batches of the same composition and the same sand with no cleaning or washing.

The degree of pigment dispersion obtained during this 15-minute grind was equivalent to a 24 hour grind in a conventional ball mill, and the dispersion was free from dirt, grit, or sand particles.

Other fabric coating compositions containing more varied and complex constituents responded equally well to this grinding process. The number and nature of many different pigments, oils, plasticizers, resins, and solvents present in combinations prepared for coating fabrics did not interfere with the fundamental improvement shown in this basic composition, which contains only one film-forming ingredient, one pigment, one solvent, and one other constituent.

EXAMPLE 5

Fabric coating composition

Certain fabric coating compositions are made by a so-called "paste process" in which dry pigments are first ground in a plasticizer on a roller mill or in a ball mill. A dry powdery resin, such as polyvinyl chloride, is then added to the pigment-plasticizer mixture, together with small amounts of volatile liquids which are solvents for the plasticizer but not for the resin. This mixture is again ground on a roller or ball mill to disperse the insoluble resin in the fluid composition. Such compositions contain 85-100% of non-volatile components.

The process of this invention is particularly useful in preparing such compositions in a single operation, thus eliminating the conventional multiple-step process. An example of this improved operation is as follows:

| | Parts by weight |
|---|---|
| Polyvinyl chloride powder | 33.68 |
| Blown castor oil | 1.11 |
| Dibutoxy ethyl phthalate | 19.10 |
| V. M. & P. naphtha | 8.84 |
| Soya lecithin | .68 |
| Orthophenyl phenol | .87 |
| Ethyl alcohol (2B denatured) | 5.69 |
| Stabilizer | 1.01 |
| Cadmium sulphide pigment | 9.70 |
| Barytes pigment | 19.32 |
| | 100.00 |

The polyvinyl chloride powder particle size was 0.5-1.0 micron.

All the ingredients, except the polyvinyl chloride, were stirred, as in Example 1, with an equal volume of 20-30 mesh Ottawa sand for 10 minutes at 1760 R. P. M. The polyvinyl chloride powder was then added and mixing continued for 10 minutes more. The entire mixture was finally strained through an 80 mesh screen to separate the sand. A yield of 72.5% was obtained. A yield of 100% was obtained on subsequent grinds of additional batches of the same composition, using the same sand without cleaning.

EXAMPLE 6

Pigment dispersion

This example illustrates one function of the process, breaking up agglomerates of pigment and dispersing the particles in a liquid without materially reducing the size of the primary particles.

| | Grams |
|---|---|
| Silicon resin | 39 |
| Titanium dioxide pigment | 198 |
| Xylene | 54 |
| | 291 |

The silicon resin was stable molecular skeleton of alternate silicon and oxygen atoms having organic radicals attached to each of the silicon atoms, and was designated as Dow-Corning Silicone DC-802.

A slurry was made of these three ingredients in an ordinary pint can and 500 grams of 20-30 mesh Ottawa sand were added and the mixture was stirred for 15 minutes at 2000 R. P. M. The separated product was a smooth dispersion which could be used as a coating composition, or as an ingredient in a coating composition containing other compatible film-forming materials.

EXAMPLE 7

Nitrocellulose lacquer mill base

A nitrocellulose base was made up as follows:

| | Grams |
|---|---|
| Butyl acetate | 9.2 |
| Methyl isopropyl carbinol acetate | 6.8 |
| Methyl isobutyl ketone | 15.7 |
| Methyl isobutyl carbinol | 7.2 |
| Isopropyl alcohol | 28.8 |
| Methyl ethyl ketone | 28.4 |
| Toluene | 8.3 |
| Petroleum naphtha | 9.9 |
| Xylene | 12.4 |
| Nitrocellulose (½ second) | 53.3 |
| | 180.0 |

This was used in a mill base as follows:

| | Grams |
|---|---|
| Nitrocellulose base | 180 |
| Blown castor oil | 29 |
| Isopropyl alcohol | 22 |
| Methyl isobutyl carbinol | 15 |
| Toluene | 51 |
| Xylene | 12 |
| Methyl ethyl ketone | 71 |
| Butyl acetate | 18 |
| Methyl isobutyl carbinol acetate | 12 |
| Methyl isobutyl ketone | 11 |
| Milori blue pigment | 67 |
| Zinc oxide pigment | 6 |
| | 494 |

A charge of 494 grams of the mill base and 1000 grams of 20-30 mesh Ottawa sand were mixed in a quart paint can for 1¼ hours at 2350 R. P. M. The sand was removed by filtration. A smooth dispersion resulted which was suitable for further mixing with additional solvent, plasticizer, and nitrocellulose to yield a lacquer. The fastest of the prior pigment-in-lacquer dispersion processes requires 6-8 hours for a comparable quality dispersion.

Other useful applications of this invention to lacquer making include dispersing the pigment in a plasticizer (in the absence of nitrocellulose) and thereafter reducing the base to a lacquer, or dispersing the pigment in the presence of all of the ingredients of the finished lacquer.

The operation of this invention is not restricted to the dispersed pigments or the dispersion media set forth in the foregoing examples. For instance, all pigments commonly used in coating compositions will respond to grinding or dispersion by this process. Such pigments include whites and colors, organic and inorganic, natural and synthetic, and extenders. Any film-forming material in reasonably fluid form (relatively low viscosity) will serve as the dispersion medium for selected pigments. Such film-formers include raw and treated oils (drying, semi-drying, and non-drying), oleo-resinous varnishes, natural and synthetic resins, oil-modified resins, cellulosic materials, emulsions of these substances, and plasticizers.

While 20–40 mesh Ottawa sand is the preferred grade of sand to use in the practice of this invention, as discussed above, the use of any sand within that range and of any origin, will produce satisfactory dispersions within relatively short grinding periods in comparison with prior processes. In the case of high quality enamels, of course, the sand used should be free of all friable impurities, and it is for this reason that Ottawa sand, or its equivalent, is preferred. In other words, when a given size range, such as 20–40 mesh, is referred to herein, it means that the sand remains within about this size classification throughout the grinding operation.

For most of the purposes of this invention, glass and some plastic beads, in the corresponding sizes, are the equivalents of sand, since they are not only hard and relatively non-friable, but are inert from the standpoint of affecting the color of the materials being dispersed. When plastic beads are used, they should of course be non-softening at the temperatures encountered in the dispersing operation.

The volume ratio of sand to the total mixture (sand, liquid, and solid to be dispersed) is important for the efficient operation of this invention. Too low a sand concentration involves long agitation or grinding periods. Too high a concentration obviously wastes space in the apparatus, decreases the fluidity of the mixture, and generally limits efficiency. The preferred concentration is 45% to 60% by volume of sand, although 30% to 65% by volume is efficiently operable.

Determination of the viscosity of the starting mixtures is difficult because they are heterogeneous (not smooth, but lumpy), but the final products are smooth and their viscosity may be determined by standard methods. The preferred conditions yield products having a viscosity of 1–250 poises at the end of the grinding period.

It is apparent from the foregoing description that this invention represents a material advance in the art of preparing dispersions. Heretofore, the processes have been slow or costly and they have required expensive and complex equipment. Much of the complexity in the art has resulted from attempts to make smooth, clean, uniform products free from dirt and grit. Elaborate care has been taken in producing high quality compositions to purify and clean the ingredients and to use them only in the best equipment. Now, quite unexpectedly, it has been found that sand, one of the substances heretofore most carefully avoided in the art, can be used in the simplest equipment to efficiently and cheaply produce high quality coating compositions. These coating compositions, for instance, can be used where critical inspection is customary—on coated fabrics, refrigerators, automobiles, furniture, and other similar articles. The savings in time, capital investment in equipment, maintenance costs, and process efficiency, compared individually or collectively with conventional grinding-dispersion processes, show this new method to be distinctly advantageous.

It is apparent that many widely different embodiments of this invention can be made without departing from the spirit and scope thereof; and, therefore, it is not intended to be limited except as indicated in the appended claims.

I claim:

1. The method of dispersing a commercial pigment in a film-forming material, which comprises agitating the pigment and film-forming material with a sand which is of 20–40 mesh size, and remains within about this size range, the agitating being continued until the commercial size pigment is reduced to a fineness of not more than 0.0005 inch when measured on a scrape-type fineness of grind tester that is graduated from 0.002 to 0.0000 inch, and separating the sand from the dispersed pigment and film-forming material.

2. The method of claim 1 in which the sand is present in an amount of 30%–65% of the total volume of sand, pigment, and film-forming material.

3. A continuous method of dispersing a commercial pigment in a film-forming material, which comprises agitating pigment and film-forming material with a sand which is of 20–40 mesh size, and remains within about this size range, the agitating being continued until the commercial size pigment is reduced to a fineness of not more than 0.0005 inch when measured on a scrape-type fineness of grind tester that is graduated from 0.002 to 0.0000 inch, continuously removing the dispersed pigment and film-forming material from the sand, and continuously adding additional pigment and film-forming material to replace that removed.

4. The method of claim 3 in which the sand is present in an amount of 30%–65% of the total volume of sand, pigment, and film-forming material.

SEYMORE HOCHBERG.

REFERENCES CITED

The following references are of record in the file of this patent:

UNITED STATES PATENTS

| Number | Name | Date |
|---|---|---|
| 115,293 | Forbes | May 30, 1871 |
| 754,756 | Edison | Mar. 15, 1904 |
| 909,835 | Walker et al. | Jan. 12, 1909 |
| 1,770,430 | Respass | July 15, 1930 |
| 1,781,435 | Carper | Nov. 11, 1930 |
| 1,794,214 | Thurm et al. | Feb. 24, 1931 |
| 1,837,772 | Hailwood et al. | Dec. 22, 1931 |
| 1,956,293 | Klein et al. | Apr. 24, 1934 |
| 2,117,965 | Kiesskalt et al. | May 17, 1938 |
| 2,212,641 | Hucks | Aug. 27, 1940 |
| 2,361,059 | Robertson | Oct. 24, 1944 |
| 2,386,885 | Downs | Oct. 16, 1945 |